(12) United States Patent
Pandipati (10) Patent No.: US 10,049,410 B2
(45) Date of Patent: *Aug. 14, 2018

(54) RECEIPTS SCANNER AND FINANCIAL ORGANIZER

(71) Applicant: KRIS ENGINEERING, INC., Montgomery Village, MD (US)

(72) Inventor: Radha K. C. Pandipati, Montgomery Village, MD (US)

(73) Assignee: KRIS ENGINEERING, INC., Montgomery Village, MD (US)

(*) Notice: Subject to any disclaimer, the term of this patent is extended or adjusted under 35 U.S.C. 154(b) by 343 days.

This patent is subject to a terminal disclaimer.

(21) Appl. No.: 14/878,363

(22) Filed: Oct. 8, 2015

(65) Prior Publication Data

US 2016/0027128 A1    Jan. 28, 2016

Related U.S. Application Data

(63) Continuation of application No. 14/197,275, filed on Mar. 5, 2014, now Pat. No. 9,165,391, which is a
(Continued)

(51) Int. Cl.
| | |
|---|---|
| *H04N 1/04* | (2006.01) |
| *G06Q 40/00* | (2012.01) |
| *G06Q 40/02* | (2012.01) |
| *G06T 11/60* | (2006.01) |
| *H04N 1/387* | (2006.01) |

(52) U.S. Cl.
CPC .......... *G06Q 40/128* (2013.12); *G06Q 40/00* (2013.01); *G06Q 40/02* (2013.01); *G06T 11/60* (2013.01); *H04N 1/04* (2013.01); *H04N 1/387* (2013.01); *H04N 1/3871* (2013.01)

(58) Field of Classification Search
CPC ...... G06Q 40/02; G06Q 40/00; G06Q 40/128; G06Q 20/20; G06Q 30/0609; G06Q 40/12; G06T 11/60; H04N 1/04; H04N 1/387; H04N 1/3871
USPC ....... 358/1.15, 473, 474, 498, 501; 235/380, 235/375; 382/313; 345/440; 705/26.35, 705/30, 33, 35
See application file for complete search history.

(56) References Cited

U.S. PATENT DOCUMENTS

| | | |
|---|---|---|
| 4,409,470 A | 10/1983 | Shepard et al. |
| 4,460,120 A | 7/1984 | Shepard et al. |

(Continued)

FOREIGN PATENT DOCUMENTS

WO    01/77937 A1    10/2001

OTHER PUBLICATIONS

Joye et al., "Secure Evaluation of Modular Functions" 2001 Int. Workshop on Cryptology and Network Security, Sep. 28, 2001.
(Continued)

*Primary Examiner* — Negussie Worku
(74) *Attorney, Agent, or Firm* — Mattingly & Malur, PC (57) ABSTRACT

A portable device is configured to obtain an image of a document, the document being of no predefined format and containing numerical data. The numerical data is extracted and automatically organized into a report in a predefined or customized format and stored into a database. The database is accessible and searchable by a user to obtain either the numerical data of the image or the report.

23 Claims, 4 Drawing Sheets

Block Diagram of the Apparatus Hardware

Related U.S. Application Data continuation of application No. 13/743,603, filed on Jan. 17, 2013, now Pat. No. 8,693,070, which is a continuation of application No. 13/459,951, filed on Apr. 30, 2012, now Pat. No. 8,373,912, which is a continuation of application No. 13/188,603, filed on Jul. 22, 2011, now Pat. No. 8,203,765, which is a continuation of application No. 12/782,271, filed on May 18, 2010, now Pat. No. 8,009,334, which is a continuation of application No. 10/054,390, filed on Jan. 24, 2002, now Pat. No. 7,746,510.

(60) Provisional application No. 60/265,406, filed on Feb. 1, 2001.

(56) References Cited

U.S. PATENT DOCUMENTS

| | | |
|---|---|---|
| 4,970,655 A | 11/1990 | Winn et al. |
| 5,091,968 A | 2/1992 | Higgins et al. |
| 5,159,548 A | 10/1992 | Caslavka |
| 5,202,552 A | 4/1993 | Little et al. |
| 5,304,786 A | 4/1994 | Pavlidis et al. |
| 5,319,181 A | 6/1994 | Shellhammer et al. |
| 5,533,168 A | 7/1996 | Abe et al. |
| 5,604,640 A | 2/1997 | Zipf et al. |
| 5,644,663 A | 7/1997 | Saito et al. |
| 5,664,109 A | 9/1997 | Johnson et al. |
| 5,751,842 A | 5/1998 | Riach et al. |
| 5,813,009 A | 9/1998 | Johnson et al. |
| 5,897,625 A | 4/1999 | Gustin et al. |
| 5,909,209 A | 6/1999 | Dickinson |
| 5,910,988 A | 6/1999 | Ballard |
| 5,920,877 A | 7/1999 | Kolster |
| 5,926,550 A | 7/1999 | Davis |
| 5,963,925 A | 10/1999 | Kolling et al. |
| 5,969,324 A | 10/1999 | Reber et al. |
| 6,009,408 A | 12/1999 | Buchanan |
| 6,029,144 A | 2/2000 | Barrett et al. |
| 6,052,693 A | 4/2000 | Smith et al. |
| 6,054,707 A | 4/2000 | Hou |
| 6,064,779 A | 5/2000 | Neukermans et al. |
| 6,115,241 A | 9/2000 | Hu |
| 6,181,660 B1 | 1/2001 | Hirayama et al. |
| 6,192,165 B1 | 2/2001 | Irons |
| 6,205,435 B1 | 3/2001 | Biffar |
| 6,240,216 B1 | 5/2001 | Nemoto et al. |
| 6,246,778 B1 | 6/2001 | Moore |
| 6,260,490 B1 | 7/2001 | Wark et al. |
| 6,265,706 B1 | 7/2001 | Oliver et al. |
| 6,367,013 B1 | 4/2002 | Bisbee et al. |
| 6,370,376 B1 | 4/2002 | Sheath |
| 6,397,194 B1 | 5/2002 | Houvener et al. |
| 6,427,032 B1 | 7/2002 | Irons et al. |
| 6,459,506 B1 | 10/2002 | Hu et al. |
| 6,462,842 B1 | 10/2002 | Hamilton |
| 6,473,811 B1 | 10/2002 | Onsen |
| 6,509,974 B1 | 1/2003 | Hansen |
| 6,533,168 B1 * | 3/2003 | Ching .............. G06K 7/10722 235/375 |
| 6,603,864 B1 | 8/2003 | Matsunoshita |
| 6,665,086 B2 | 12/2003 | Hull et al. |
| 6,674,924 B2 | 1/2004 | Wright et al. |
| 6,676,016 B1 | 1/2004 | Coskrey, IV |
| 6,683,697 B1 | 1/2004 | Lech |
| 6,745,186 B1 | 6/2004 | Testa et al. |
| 6,760,490 B1 | 7/2004 | Zlotnick |
| 6,934,691 B1 | 8/2005 | Simpson et al. |
| 6,992,799 B1 | 1/2006 | Chen |
| 7,069,240 B2 * | 6/2006 | Spero .................. G06Q 20/20 705/26.35 |
| 7,155,404 B1 | 12/2006 | Johnson et al. |
| 7,328,276 B2 | 2/2008 | Alisuag |
| 7,424,672 B2 | 9/2008 | Simske et al. |
| 7,511,852 B2 | 3/2009 | Wei |
| 7,528,975 B2 | 5/2009 | Yamamoto et al. |
| 7,593,120 B2 | 9/2009 | Kitora et al. |
| 7,636,365 B2 | 12/2009 | Chang et al. |
| 7,724,400 B2 | 5/2010 | Cousins et al. |
| 7,746,510 B2 * | 6/2010 | Pandipati .............. G06Q 40/00 235/375 |
| 7,796,836 B2 | 9/2010 | McGee |
| 7,812,859 B2 | 10/2010 | Ito et al. |
| 7,844,594 B1 | 11/2010 | Holt et al. |
| 7,882,000 B2 | 2/2011 | Jones |
| 7,911,643 B2 | 3/2011 | Yamada et al. |
| 7,958,059 B2 | 6/2011 | de Hilster et al. |
| 8,000,529 B2 | 8/2011 | Chao et al. |
| 8,009,334 B2 | 8/2011 | Pandipati |
| 8,019,647 B1 | 9/2011 | Gidwani et al. |
| 8,079,525 B1 | 12/2011 | Zolotov |
| 8,099,734 B2 | 1/2012 | Stephenson |
| 8,140,955 B2 | 3/2012 | Kim |
| 8,174,724 B2 | 5/2012 | Kitora et al. |
| 8,190,695 B2 | 5/2012 | Rekimoto et al. |
| 8,203,734 B2 | 6/2012 | Kadota |
| 8,203,765 B2 | 6/2012 | Pandipati |
| 8,373,540 B2 | 2/2013 | Solomon |
| 8,373,912 B2 | 2/2013 | Pandipati |
| 8,400,668 B2 | 3/2013 | Kang et al. |
| 8,488,211 B2 | 7/2013 | Ruskin et al. |
| 8,582,182 B2 | 11/2013 | Zahnert et al. |
| 8,605,341 B2 | 12/2013 | Miyazaki |
| 8,693,070 B2 | 4/2014 | Pandipati |
| 8,879,089 B2 | 11/2014 | Sakura |
| 8,988,556 B1 | 3/2015 | Karakotsios et al. |
| 2002/0015174 A1 | 2/2002 | Nanpei |
| 2002/0019808 A1 | 2/2002 | Sharma |
| 2002/0062292 A1 | 5/2002 | Iwaguchi et al. |
| 2002/0123949 A1 | 9/2002 | VanLeeuwen |
| 2002/0172095 A1 * | 11/2002 | Pandipati .............. G04R 20/26 368/47 |
| 2003/0083966 A1 | 5/2003 | Treibach-Heck et al. |
| 2004/0158816 A1 * | 8/2004 | Pandipati ............. G06Q 10/109 717/120 |
| 2004/0162702 A1 * | 8/2004 | Pandipati ........... G01G 19/4146 702/173 |
| 2004/0190057 A1 | 9/2004 | Takahashi et al. |
| 2004/0196509 A1 | 10/2004 | Cousins et al. |
| 2005/0225810 A1 | 10/2005 | Sun |
| 2007/0076245 A1 | 4/2007 | Sugimoto et al. |
| 2009/0195818 A1 | 8/2009 | Negishi |
| 2016/0027128 A1 * | 1/2016 | Pandipati ............... G06Q 40/00 705/33 |
| 2017/0323393 A1 * | 11/2017 | Cussen .................. G06Q 40/12 |
| 2017/0337515 A1 * | 11/2017 | Fredericks ............. G06Q 40/12 |
| 2018/0025340 A1 * | 1/2018 | Schlosser ............. G06Q 20/209 |
| 2018/0053259 A1 * | 2/2018 | Brahma ................. G06Q 40/12 |

OTHER PUBLICATIONS

Baumann et al. "Message Extraction from Printed Documents—A Complete Solution," Proceedings of the Fourth International Conference on Document Analysis and Recognition, Conference Aug. 18-20, 1997, Ulm, Germany, Publisher IEEE Computer Society, vol. 2, 1997, pp. 1055-1059.

Anonymous (1997). Visioneer announces PaperPort EasyPay for quicken and QuickBooks from intuit. PR Newswire Association LLC. Retrieved from:http://search.proquest.com/professional/docview/677407024?accountid=142257.

Anonymous (2001). NewSoft introduces the most compact and mobile business card scanning solution; presto! bizcard reader packs 600 dpi scanning into a palm-size device. Business Wire. Retrieved from http://search.proquest.com/professional/docview/676528353?accountid=142257.

"Automated Payment Order Input System" ABBYY Fine Reader Bank Version 4.1 User's Manual, ABBYY Software House (BIT Software) Moscow 1998 (Russian/English Language Translation).

* cited by examiner

FIG. 1 Block Diagram of the Apparatus Hardware

FIG. 3 Various Forms of Scanned Receipts

FIG. 2 Flow Chart of the Working of the Apparatus

| Date | Description | Amount |
|---|---|---|
| January 2006 | Grocery | |
| | --Milk 1g | $3.99 |
| | --Coffee Powder 11 oz | $5.99 |
| | --Sugar 5 lbs | $2.99 |
| | --Rice 5 lbs | $2.49 |
| | --Aqua Fresh 6 oz | $1.99 |
| | --Bounty 165 ct | $2.39 |
| | --Potato - wht 5 lbs | $1.99 |
| | --Diet Sprite | $5.99 |
| | | |
| | | |
| | | |
| | Toiletry | |
| | --Face Cream | $6.59 |
| | --Face Soaps | $8.99 |
| | --Eyeliner | $4.99 |
| | --Nivea WC Face 1.7Z | $11.99 |
| | --Shout 150 oz | $7.99 |
| | --Bounce 160 ct | $5.99 |
| | | |
| | | |
| | Others | |
| | --Ritz 1 hour process | $12.09 |
| | --6' x 9' Rug | $159.00 |
| | | |
| | | |

FIG. 4A An Example of Tabular Form of Organized Information

FIG. 4B An Example of Pie-chart Form of Organized Information

RECEIPTS SCANNER AND FINANCIAL ORGANIZER

BACKGROUND OF THE INVENTION

Field of the Invention

This invention relates to a scanner apparatus to scan receipts into a computer and a software program which automatically organizes all the information that can be viewed in various formats, namely, tabular statements, pie-charts, etc., and allows for record keeping, budgeting and reconciliation.

Description of the Related Art

Almost everybody might have wondered at one time or other about where his/her salary is going. Many people think "Although I make more than enough money, I do not know how I am spending it".

You might have attempted to keep track of how you were spending by saving all the receipts, checks, bills and notes about cash transactions, etc. You patiently entered all the receipts into the computer (namely into one of the budgeting or finance managing software programs). This is very laborious and time consuming and after a while you will loose patience and stop entering the data. There ends the plan to know where your salary is going.

Now, with this invention, you can stop wasting your time typing. Simply take your file of receipts and feed them into the scanner. Within seconds after scanning the receipts, the software organizes all the information into a file on your computer that can be viewed in various formats. It's fast, easy, and convenient. Once the receipts are scanned into your computer, you can use the software to manage your expense information.

A thorough patent search resulted in the following related patents but none of them has proposed so far the idea proposed in this invention. For example, the U.S. Pat. No. 6,240,216 entitled "Method and apparatus for processing an image, storage medium for storing an image processing program" relates to an image method and more particularly to mask processing (noise reduction, smoothing of a pattern or the like) of binary image data by software.

There are a number of different kinds of scanners commercially available and some of these have been patented. However, none of them are of the type described in this invention. When a receipt is fed or inserted the scanner of this invention automatically grabs and moves the receipt while it is being scanned and stops at the completion of the scanning of the bill. In addition, the data is automatically captured and organized into a database which allows the data scanned to be viewable in a number of predefined formats which also can be customized if desired.

The prior art references describe excellent applicability to various purposes other than the purpose the present invention is intended. For instance, the U.S. Pat. No. 5,604,640 entitled "Business card scanner and method of use" relates, in general, to optoelectronic devices and, in particular, to scanning mixed media information cards, storing the information, and displaying the scanned information in a variety of display formats. However, feeding and scanning of receipts and having associated software program to organize the data is not dealt with.

The U.S. Pat. No. 5,644,663 entitled "Portable image scanner having manual or automatic feed" relates to an image scanner for automatically scanning a document to optically read out and output image data that is on the document to an image processing device such as a computer, and more particularly to a portable image scanner capable of selectively uniting a cover member to a scanner body to feed a cut-sheet document to be scanned, or detaching the cover member from the scanner body to move the independent scanner body on a thick document such as a book.

The U.S. Pat. No. 6,115,241 entitled "Attachment of a mobile scanner to a portable computer" generally relates to a portable scanning system and more particularly to a versatile attachment of a mobile scanner to a portable computer.

The U.S. Pat. No. 5,897,625 entitled "Automated document cashing system" relates to automated banking systems and machines including those which employ or are an improvement on automatic teller machines (ATMs). These systems perform the usual ATM functions and additionally cash money orders and checks for the user without the presence or the assistance of a teller, allow the depositing of cash into the machine and provide additional functions, such as transferring money by wire, depositing cash into an account or purchasing end user items from the machine.

The U.S. Pat. No. 5,920,877 entitled "Text acquisition and organizing system" relates to apparatus for acquiring and manipulating text and, more particularly, to apparatus for acquiring discrete text strings and automatically formatting those text strings, as they are received, into a preselected data format structure. There are a number of situations in which a researcher or reader may desire to record and organize printed or displayed text included in an existing work for future reference or for some other future use. As used herein, the term "text" is meant to encompass information that is intended for presentation for human comprehension and may comprise symbols, phrases, sentences in natural or artificial language, pictures, diagrams, and tables.

There has not been proposed so far a configuration consisting of a scanner and a software program in order to achieve the purpose described by the present patent application. Thus, none of the prior art references proposed the idea of this invention.

SUMMARY OF THE INVENTION

Briefly stated, the invention is an apparatus to scan receipts with a software which automatically processes, organizes and saves all the information from the scanned receipts. The invention includes a scanner that is connected to a computer through a Universal Serial Bus (USB) port or parallel port and a software program loaded into the computer. As the receipts are being scanned, all the information from the scanned receipts is automatically entered into the computer. A user needs to insert one receipt at a time into this scanner. The receipts can be grocery receipts, various purchase receipts, credit card receipts, bank statements, etc. The invention automatically collects all the data from the receipts the user has scanned, and processes and organizes all the information. The software categorizes each transaction, so you have instant insight into your expenses. You always know exactly where your money goes. The invention creates reports including Income-Expense, Cash Flow, Budget, etc. The invention instantly lets you customize, sort, and subtotal report information on-screen, and shows where any amount in a report comes from. The invention shows a clear picture of your expenses with a number of instant graphs. The organized data can also be viewed in tabular form or pie-chart form, etc. The apparatus allows editing the information from the scanned receipts. The apparatus also automatically saves the information scanned from the receipts in the Quicken Interchange Format (QIF), allowing it to be imported by any financial management program like Quicken, Money, etc. Each scanned receipt will be turned into an individual transaction. The multiple items in the receipt will be used to create a "split" transaction with proper customizable categories. The software loaded into the computer allows for record keeping, budgeting and reconciliation.

For example, making a budget is easy but adhering/implementing it is difficult, but not when you use the system of this invention. Software enables you to create a budget. Once you start scanning the receipts, it lets you know at any time where you stand with respect to your budget, whether you kept up or you need adjustment. A budget lets you set a goal for the amount of money you want to spend in a particular category—for example, $100 per month for entertainment. Then you can run a monthly budget report to compare the budgeted amount to the actual amount that you spent.

The software allows the data from the receipts to be presented in various formats. For example, a list of all the items you have purchased; another list of items you bought from a particular department store; how many times you visited a particular restaurant and how much you spent each time; how much you spent for clothes versus food versus eating outside, etc.

Thus, the software is a simple-to-use financial organizer where all receipt information gets organized into an easily useable format. The software has lots of features to make your life easier. It allows you to find any expense. You can also add notes to the transactions. The semi-processed data can be imported into one of your already existing or familiar programs like Quicken, Money, etc.

Other and further features of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

An embodiment of the present invention will be described hereinafter with reference to the accompanying drawing, in which.

DETAILED DESCRIPTION OF THE PREFERRED EMBODIMENT

Figure 1:
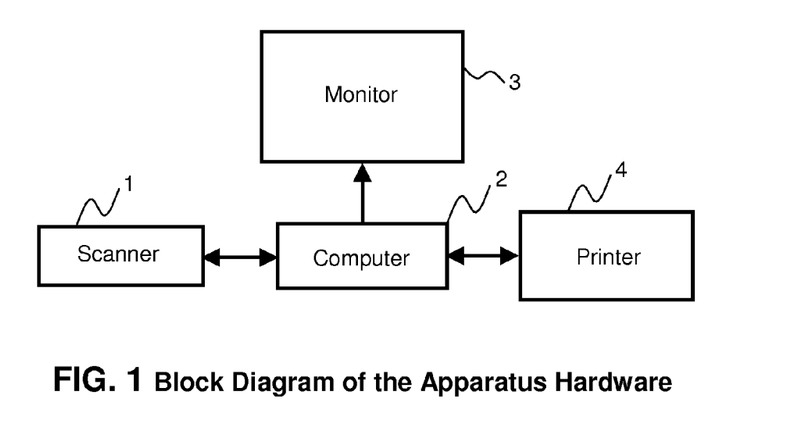
FIG. 1: is a schematic block diagram illustrating the overall arrangement of the scanner and the computer with associated monitor, printer, etc. This overall arrangement is a representative embodiment of the present invention.

The system, as illustrated in FIG. 1, contains the scanner 1 and the software. The scanner 1 is different from conventional large size scanners you might have seen in some offices or in copying shops. It is a small, light-weight and portable one, and has cables that connect to power outlet for its power and to a computer 2 for communicating back and forth with it. It is capable of scanning receipts of different widths and thicknesses; it has a built-in feeder that takes in receipts as they are fed, similar to a fax machine where the fax page is swept in.

Figure 2:
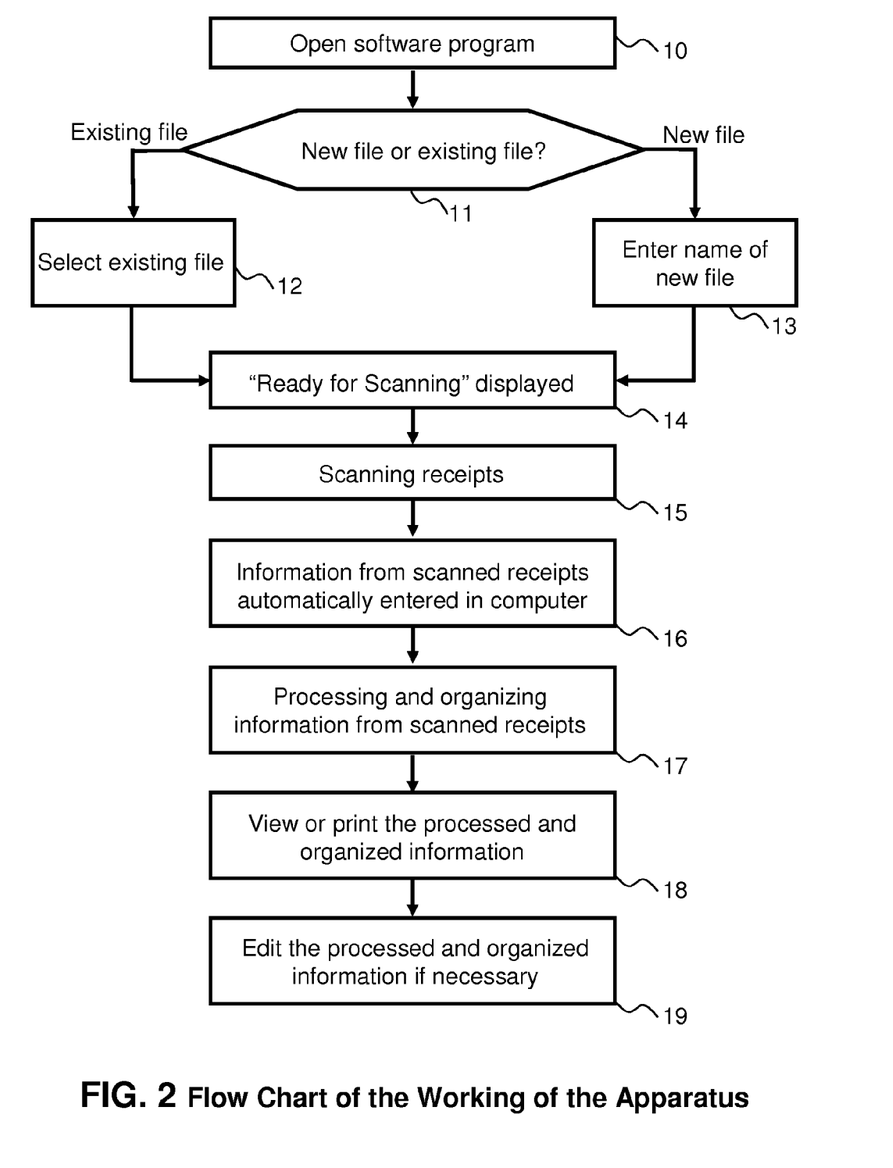
FIG. 2: is flow chart of the working of the apparatus.

FIG. 2 presents a flow chart of the working of the apparatus as explained in detail below. The scanner 1 is connected to a computer 2 using a USB port as illustrated in FIG. 1. Before scanning, the user turns on the scanner 1 and the computer 2. Open the software program by clicking on the icon displayed on the screen (see the monitor 3 in FIG. 1) (Step 10). When the program is loaded into the computer 2 it automatically creates an icon on the screen (see the monitor 3 in FIG. 1). The software opens a window displaying two options (Step 11), to open an existing file (Step 12) or to open a new file. In the case of a new file, it allows you to select the name of the new file by typing it in (Step 13). Once a file is selected, it displays "ready for scanning" (Step 14) Now you can feed the receipts into the scanner 1 one at a time (Step 15). Click "scanning complete" once you have finished scanning all the receipts. You will find that all the information from the scanned receipts is automatically entered into the computer 2 (Step 16). Each receipt is entered as a separate transaction using preselected, or default categories. You have the flexibility to change the categories any time and reconcile. Now the software program in the computer 2 has organized all the information (Step 17). This new or updated file is ready for viewing on the screen (see the monitor 3 in FIG. 1) and/or for printing (see the printer 4 in the FIG. 1) (Step 18). Also, after viewing the file, if needed you can modify or edit each transaction (Step 19). Further, the software also allows for record keeping, budgeting and reconciliation.

Figure 3:
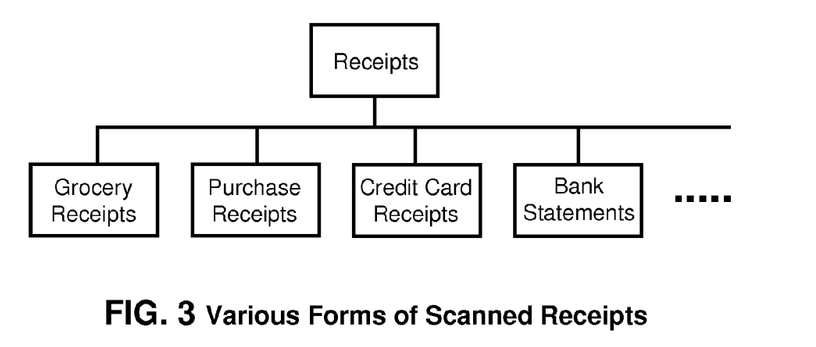
FIG. 3: is an illustration of various forms of scanned receipts.
Figure 4A:
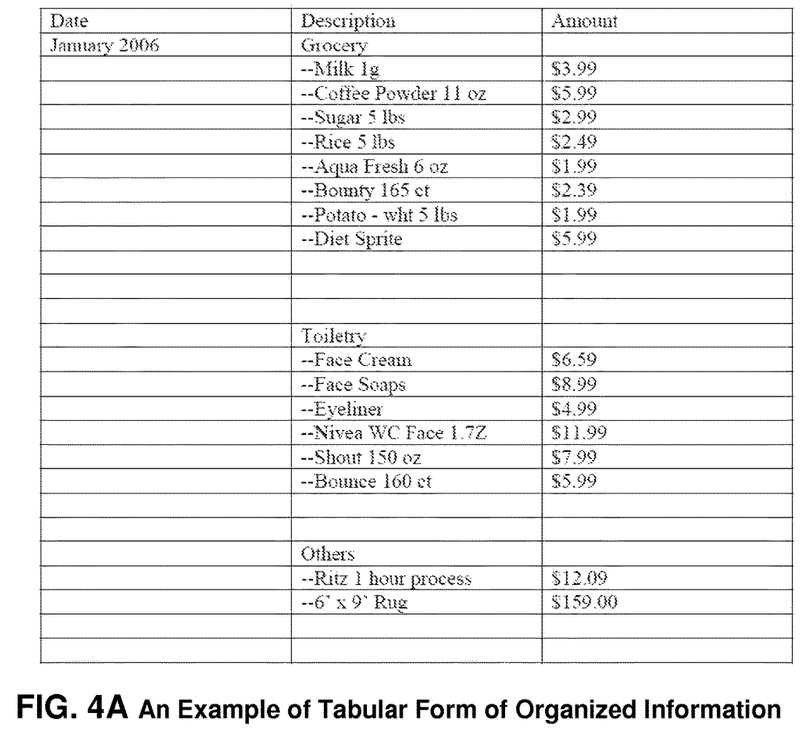
FIG. 4A: is an example of Tabular form of Organized Information.
Figure 4B:
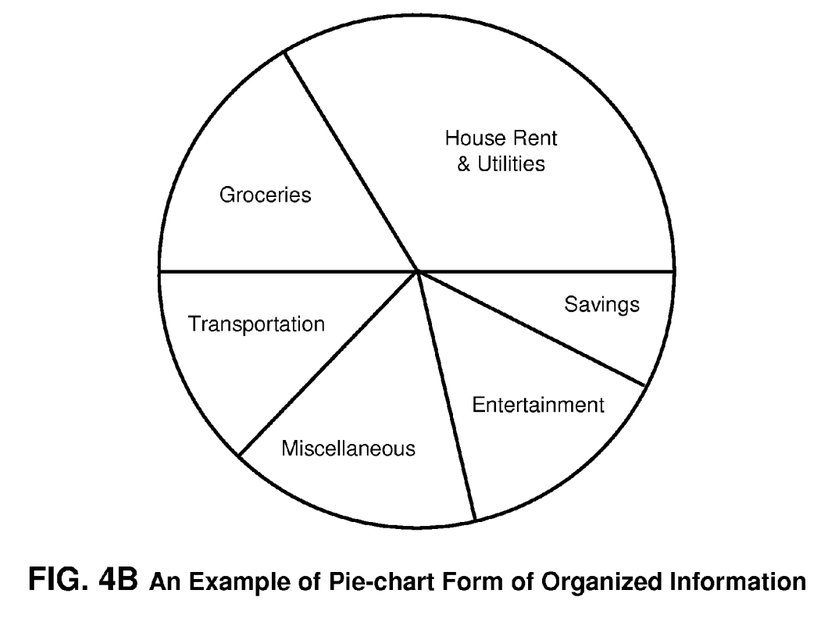
FIG. 4B: is an example of Pie-Chart form of Organized Information.

Thus, the system "Receipts Scanner and Financial Organizer" is an apparatus to scan receipts and a software to automatically process, organize and save all the information from the scanned receipts; it is connected to a computer 2 through a USB port and a software program loaded into the computer. When receipts are fed into the scanner, the invention automatically enters all the information into the computer 2 that is connected to the scanner instead of manually typing the information in. As receipts are scanned, all the information from the receipts is automatically entered into computer 2; a software program operating within the computer 2 processes all the information from the scanned receipts and organizes it. FIG. 3 illustrates various forms of scanned receipts. The invention allows editing of the information from the scanned receipts and organized data. This organized data can be viewed in various formats, namely, tabular form (see FIG. 4A), pie-chart form (see FIG. 4B), etc. The tabular data formats include income-expense reports, planned versus actual budget, list of all expenses with different categories, etc. The invention further processes the data and enables comparison with pre-customized budgets or limits in each category.

The invention also allows QIF formatted data to be imported into any financial organizer program like Quicken, Money, etc.

Possible Extensions

The invention even comes up with suggestions and recommendations using its large up-to-date data base, namely, how you can save on groceries, how you can improve your health habits, how you can save on insurance, how you can save on travel, compares expenses each month with the previous month, prompts you when certain payments might have to be made, projects certain future expenses using data it has compiled (like birth days, marriage days, etc), how you can maintain budget by changing where you buy or what brand name item you buy, gathers information for taxes (keeps track of items that go into tax preparations), etc.

The invention claimed is:

1. A method for processing a paper expense receipt using a computer system, comprising the steps of:
   receiving at a computer input device the paper expense receipt from an individual incurring an expense;
   receiving on a computer processor an electronic image of the expense receipt from the computer input device;
   processing the electronic image to automatically obtain expense data by:
      using software to retrieve at least the relevant data from the electronic image; and
      parsing the relevant data to obtain the expense data within the relevant data; and
   populating an electronic expense report with the expense data; and
   displaying the electronic expense report to the individual;
   wherein the expense receipt has no predefined format for the computer system.

2. A computer system for processing a paper expense receipt comprising:
   a computer input device for receiving the paper expense receipt from an individual incurring an expense, and creating an electronic image of the receipt;
   a computer processor in communication with the computer input device;
   software operating on the computer processor for processing the electronic image to automatically obtain expense data by:
      retrieving at least the relevant data from the electronic image;
      parsing the relevant data to obtain the expense data within the relevant data; and
      populating an expense report with the expense data; and
   a display in communication with the computer on which the expense report is displayed to the individual;
   wherein the expense receipt has no predefined format for the computer system.

3. The system of claim 2, wherein the computer input device is a scanner.

4. The system of claim 2, wherein the software for processing the electronic image further obtains the expense data by:
   obtaining all data from the electronic image; and
   parsing the obtained data to obtain the expense data.

5. In a system having a scanner in communication with a computing device, a method comprising the steps of:
   obtaining, by the scanner, an electronic image of a document having no predefined format and containing numerical information;
   automatically capturing, in the computing device, the numerical information in the obtained electronic image;
   organizing, in the computing device, the captured numerical information;
   enabling editing of the captured numerical information;
   enabling viewing of the captured numerical information in a desired format; and
   combining the captured numerical information with other numerical information previously captured from other documents into a report.

6. A computer-based system which receives a digital image of a document having no predefined format and containing numerical information from a device that captures an image of the document, the computer-based system storing therein computer executable code for performing a method comprising the steps of:
   processing the digital image of the document having no predefined format and containing numerical information to automatically extract the numerical information;
   enabling editing of the extracted numerical information; and
   creating a report based on the extracted numerical information.

7. The computer-based system according to claim 6, wherein the method performed by the computer executable code further comprises the step of:
   combining the extracted numerical information with other information stored in the computer-based system that was previously extracted from other documents having no predefined format.

8. A non-transitory computer readable storage medium storing thereon a program containing instructions to cause a computing device to perform the steps of:
   receiving images of documents which have no predetermined format and which contain numerical information;
   automatically extracting the numerical information from the documents;
   outputting the extracted numerical information to a display as a report to allow a user to view and edit the numerical information.

9. A non-transitory computer readable storage medium storing thereon a program containing instructions to cause a computing device to perform the steps of:
   receiving an electronic image of a document, having no predefined format and containing numerical information, from a device capable of creating the electronic image;
   automatically extracting and organizing the numerical information contained in the electronic image of the document;
   enabling editing of the numerical information;
   enabling viewing of the numerical information in a desired format;
   combining the numerical information with other numerical information previously obtained by the device into a report.

10. A non-transitory computer readable medium having computer executable instructions for performing a method comprising the steps of:
    receiving an image of a document, the document being of no predefined format and containing numerical information;
    processing the image of the document to automatically extract the numerical information from the image; and
    creating report information from the extracted numerical information.

11. The non-transitory computer readable medium according to claim 10,
    wherein the document is a receipt and the report information summarizes expense information contained in the extracted numerical information on the receipt.

12. A system comprising:
    a mobile device configured to obtain an image of a document, the document being of no predefined format and containing numerical data; and
    a computer configured to receive the image of the document, automatically extract the numerical data, and automatically organize the numerical data into at least one report in a predefined or customized format and store the at least one report into a database, wherein the database is accessible by a user to obtain either the numerical data of the image or the at least one report.

13. An apparatus comprising:
a computer; and
a storage database,
wherein the computer is configured to receive an image of a document having no predefined format and containing numerical information,
wherein the computer is further configured to automatically extract the numerical information from the image, and
wherein the computer is further configured to organize the numerical data into at least one report having a predefined or customized format and store into the storage database.

14. A system comprising:
a scanner which obtains an image of a document containing numerical information and having no predefined format; and
a computer which is configured to receive the image of the document and automatically extract the numerical information from the image,
wherein the computer is further configured to create report information from the extracted numerical information.

15. The system according to claim 14, wherein the document is a receipt and the report information summarizes expense information contained in the numerical information on the receipt.

16. A non-transitory computer readable medium having computer executable instructions for performing a method of processing expense information, the method comprising:
receiving electronic image information of a plurality receipts having various formats, each of said receipts containing expense information printed thereon;
processing said electronic image information to automatically extract numerical data obtained from each of the receipts to obtain said expense information from said electronic image information;
categorizing said expense information for each of the receipts into one or more predetermined categories to obtain categorized information for each of the receipts,
wherein said categorized information for each of the receipts is combined with categorized information for other said receipts to produce report information for one or more of said predetermined categories.

17. A non-transitory computer readable medium as claimed in claim 16, wherein the electronic image information from the receipts is automatically received from a portable device, and the expense information for each of the receipts is captured from the electronic image information for each of the receipts and categorized into one or more of said predetermined categories.

18. A non-transitory computer readable medium having computer executable instructions for performing a method of processing expense information, the method comprising:
receiving an electronic image of a receipt, the receipt being of no predefined format and containing expense information printed thereon;
processing said electronic image to automatically obtain said expense information from said electronic image;
categorizing said expense information for the receipt into one or more predetermined categories to obtain categorized information for the receipt,
wherein said categorized information for the receipt is combined with categorized information of other receipts to produce report information for one or more of said predetermined categories.

19. A non-transitory computer readable medium having computer executable instructions for performing a method comprising the steps of:
receiving electronic information of a receipt having no predefined format;
processing the electronic information to automatically obtain expense information contained on the receipt;
organizing the expense information in the form of a report;
outputting the expense information organized in the form of a report to a display.

20. An apparatus which manages and organizes expense information, comprising:
a scanner to scan various types of receipts, each said receipt containing expense information printed thereon, said scanner scanning each said receipt to obtain scanned information for each receipt; and
a computer in communication with the scanner, said computer executing a software which receives said scanned information for each receipt and which processes the scanned information including numerical data in the receipt to automatically obtain said expense information from said scanned information,
wherein said expense information for each receipt is categorized into one or more predetermined categories to obtain categorized information for each receipt,
wherein said categorized information for each receipt is combined with categorized information for other said receipts to produce and display report information for one or more of said predetermined categories;
wherein the apparatus is configured to process receipts of no predefined format that include grocery receipts, purchase receipts, credit card receipts or bank statements having different widths and thicknesses.

21. An apparatus as claimed in claim 20, wherein as the receipts are being scanned, the scanned information from the scanned receipts is automatically received by the computer and the expense information for each receipt is automatically captured from the scanned information for each receipt, and categorized into one or more of said predetermined categories.

22. An apparatus for managing financial information, comprising:
a scanner for scanning various types of receipts of no predefined format, each said receipt containing expense information printed thereon;
a computer in communication with said scanner, said computer receiving a scan of each said receipt, and automatically processing said scan by collecting the expense information from the scan; and
a display device in communication with said computer, wherein said computer organizes said expense information collected from each said scan by categorizing the expense information into one or more predetermined expense categories to obtain report information,
wherein said report information for at least one of said predetermined categories is displayed on said display device.

23. An apparatus as claimed in claim 22, wherein said scanner is a portable scanner configured to automatically feed the receipt through said scanner while the receipt is being scanned, said receipts of no predefined format including grocery receipts, purchase receipts, credit card receipts or bank statements having different widths and thicknesses.

\* \* \* \* \*